United States Patent [19]

Boettner

[11] 4,352,687
[45] Oct. 5, 1982

[54] FURNACE DELIVERY SYSTEM

[75] Inventor: George B. Boettner, Corning, N.Y.

[73] Assignee: Corning Glass Works, Corning, N.Y.

[21] Appl. No.: 244,022

[22] Filed: Mar. 16, 1981

[51] Int. Cl.³ .............................................. C03B 5/23
[52] U.S. Cl. ...................................... 65/134; 65/128;
    65/135; 65/136; 65/326; 65/346; 65/356
[58] Field of Search ................. 65/126, 128, 135, 136,
    65/137, 326, 327, 346, 356, 134

[56] References Cited

U.S. PATENT DOCUMENTS

| | | | |
|---|---|---|---|
| 2,038,627 | 4/1936 | Badger | 65/135 X |
| 2,282,554 | 5/1942 | Barker, Jr. | 65/128 |
| 2,993,079 | 4/1957 | Augsburger . | |
| 3,244,493 | 4/1966 | Cala | 65/346 X |
| 3,268,321 | 8/1966 | Chapman | 65/326 X |
| 3,519,412 | 7/1970 | Olink | 65/346 X |
| 3,524,206 | 8/1970 | Boettner et al. . | |
| 3,583,861 | 6/1971 | Preston . | |
| 3,725,558 | 4/1973 | t'Serstevens . | |
| 3,742,111 | 6/1973 | Pieper . | |
| 3,942,968 | 3/1976 | Pieper . | |
| 4,029,887 | 6/1977 | Spremulli . | |
| 4,143,232 | 3/1979 | Bansal et al. . | |

FOREIGN PATENT DOCUMENTS 1412599 12/1972 United Kingdom .

Primary Examiner—Arthur D. Kellogg
Attorney, Agent, or Firm—John P. DeLuca

[57] ABSTRACT

A glass delivery system is disclosed having a glass conducting pipe enclosed within a refractory structure. The refractory structure is spaced about the pipe and defines a closed space for receiving therein a quantity of the glass. Heat input devices are located in the closed space for supplying heat to the pipe. The refractory structure may include heat exchange passages for circulation of a first heat exchange fluid therethrough. Means may be included for introducing a second gaseous fluid within the closed space between the refractory structure and the pipe for removing heat given up by the glass and under certain conditions the first fluid may act as an inert atmosphere or purge gas for protecting certain components of the system from deleterious ambience. The first heat exchange fluid removes a relatively greater portion of the heat energy given up by the glass than the second fluid.

27 Claims, 2 Drawing Figures

FURNACE DELIVERY SYSTEM

BACKGROUND OF THE INVENTION

The present invention relates to a delivery system for conditioning and conveying molten thermoplastic material produced in a melting furnace. The delivery system receives the thermoplastic material from the furnace and discharges at some desired temperature and consistency for forming a product. The invention more particularly pertains to a glass delivery system wherein the glass is conveyed through a conduit and simultaneously conditioned to a desired relatively uniform temperature and viscosity by means of a heat exchange device for efficiently and economically removing heat from the glass as it passes therethrough. The conduit may be immersed or surrounded by stagnant glass. Heaters, adapted to operate in molten glass are located about the conduit, provide uniform heat input into the glass within the conduit and prevent localized hot spots.

Vertically oriented electric glass melting furnaces have been known in the prior art for some time, but it has been only in the last several years that such furnaces have been brought to large scale commercial application. In more recently developed furnaces, such as the type illustrated in U.S. Pat. Nos. 2,993,079, 3,524,206, 3,583,861, 3,725,558, 3,742,111, 3,942,968, 4,029,887 and 4,143,232, glass forming batch materials are fed to the upper end of a vertical chamber and refined molten glass is withdrawn from the bottom of the chamber. High quality glass is thus produced in a single vertical chamber, with melting occurring in an upper portion thereof and preferably some refining occurring at the bottom portion.

The molten glass withdrawn from the electric furnace is usually received within a laterally extending connected channel situated at one side of the furnace bottom and thereafter directed through a vertical passageway or riser to a mixing chamber and/or a forehearth. For example in U.S. Pat. No. 3,942,968 to Pieper, the molten glass is withdrawn laterally from the furnace through a connected channel, thereafter is directed to a riser portion where colored materials may be added, from the riser to a downwardly extending mixing chamber, laterally from the chamber through a second connected channel, then upwardly through a second riser, and finally to a forehearth or feeder. In the Pieper system, the delivery passageway extending from the furnace bottom is formed in refractory block material of the contiguous walls of the furnace and riser, and an electrode is positioned in the passageway. It will be appreciated by those skilled in the art of melting glass that the passageway electrode may not be used when coalesced forming or batch material surrounds the electrode because the cold material will not be electrically conductive.

In some electric glass melting furnaces heretofore employed, a refractory metal delivery conduit extends from near the center of the bottom of the furnace to the confines or passageway of the connected channel. The conduit is either placed on the furnace bottom wall or is laid into a trough incorporated in the furnace bottom wall, and the conduit is protected from exposure to solid or liquid contaminants, which originate in the batch and sink through the molten glass, by a cover or refractory block. The delivery system of such type of prior art furnace is provided with devices for heating the cold glass or raw material initially within the conduit because, during the startup or beginning stage of operation of the furnace, the heat conducted through the conduit from the molten glass in the furnace and connected channel to the glass or raw materials is not sufficient to melt all the cold batch material initially within the conduit.

In the U.S. Pat. No. 4,029,887 to Spremulli, an apparatus is disclosed for heating glass or raw materials within a delivery conduit extending from an electric glass melting furnace to a connected channel. The conduit is made of an electrically conductive refractory metal material such as molybdenum and is used to conduct current from inside the furnace to its exit end in the channel. Joule effect heating between the entry and exit ends of the conduit and electrodes in the furnace and connected channel indirectly cause the cold glass or raw materials within the conduit to partially melt, to the extent that the materials within the conduit begin to flow therefrom. A flange assembly for use with the molybdenum conduit is also disclosed. In the Spremulli patent, the delivery conduit is connected to the furnace with a forehearth channel wherein the glass is conditioned for delivery to an outlet end thereof and a forming means.

In the British Pat. No. 1,412,599 commonly assigned to the assignee herein, a delivery system utilizing stationary mixing devices and a heat exchange vessel is disclosed. The system does not consider the problem of high heat loss since it is located downstream of the forehearth in a forming operation.

In a series of related U.S. patent applications, Ser. Nos. 243,811, 244,001 and 244,024 filed this same date and assigned to the assignee herein, various arrangements of glass melting and transport systems are disclosed in detail. It should be understood that although significant differences exist with such disclosures and the present invention, to the extent necessary, the teachings of said applications are to be considered incorporated herein by reference.

It is well known in the glass melting and forming art that forehearths require substantial amounts of heat energy in order to condition the glass received from the furnace temperature to some desired forming temperature at the forehearth outlet. Thus, the forehearth is a net consumer of energy and the anomalous condition exists wherein a large amount of heat energy is required to "cool" the glass to the proper forming temperatures.

It is also known that molybdenum metal (moly), a preferred glass contact material used herein, has significantly higher wear resistance to moving molten glass than conventional refractory materials. However, it is also well known that moly tends to oxidize at temperatures in excess of 550°–600° C., and thus, the moly must be protected from deleterious atmosphere (oxygen) when it is used at or above these elevated temperatures. In Spremulli, '887 for example, the outlet pipe used therein is described as being manufactured from moly components and various protection devices are included therein including cooling means and means for introducing purge gas to protect those portions of the moly pipe that are susceptible to oxidation from the ambience. The Spremulli system, however, requires the use of a conventional forehearth channel for cooling the glass.

The present invention performs the functions of transportation, cooling, and homogenizing molten glass, wherein the useful life of the delivery system is significantly increased and glass-refractory corrosion products, producing glass inhomogeneity, are eliminated. Further, the system greatly reduces the net energy required to condition the glass.

SUMMARY OF THE INVENTION

A delivery system for conducting molten thermoplastic material from a furnace and delivering the material at a desired homogeneity to a remote outlet includes a pipe member having an inlet adapted to receive the material at one end from the furnace and a remote outlet for delivering same. A surrounding structure located about the pipe defines a closed space thereabout. Heat input devices are located in the closed space for supplying heat to the material therewithin. The structure may include heat exchange passages for circulation of a heat exchange fluid therethrough which removes some of the heat from the thermoplastic material transferred thereto by convection, conduction and radiation. Means may be included for introducing a gaseous fluid within the closed space. The gaseous fluid functions as a heat conducting medium and, under certain conditions, the fluid acts as an inert atmosphere or purge gas for protecting certain components of the system from the ambience. There may also be provided means for introducing thermoplastic material into the closed space for covering the exterior of the pipe and the heat input devices located in said space.

DESCRIPTION OF THE PREFERRED EMBODIMENTS

Figure 1:
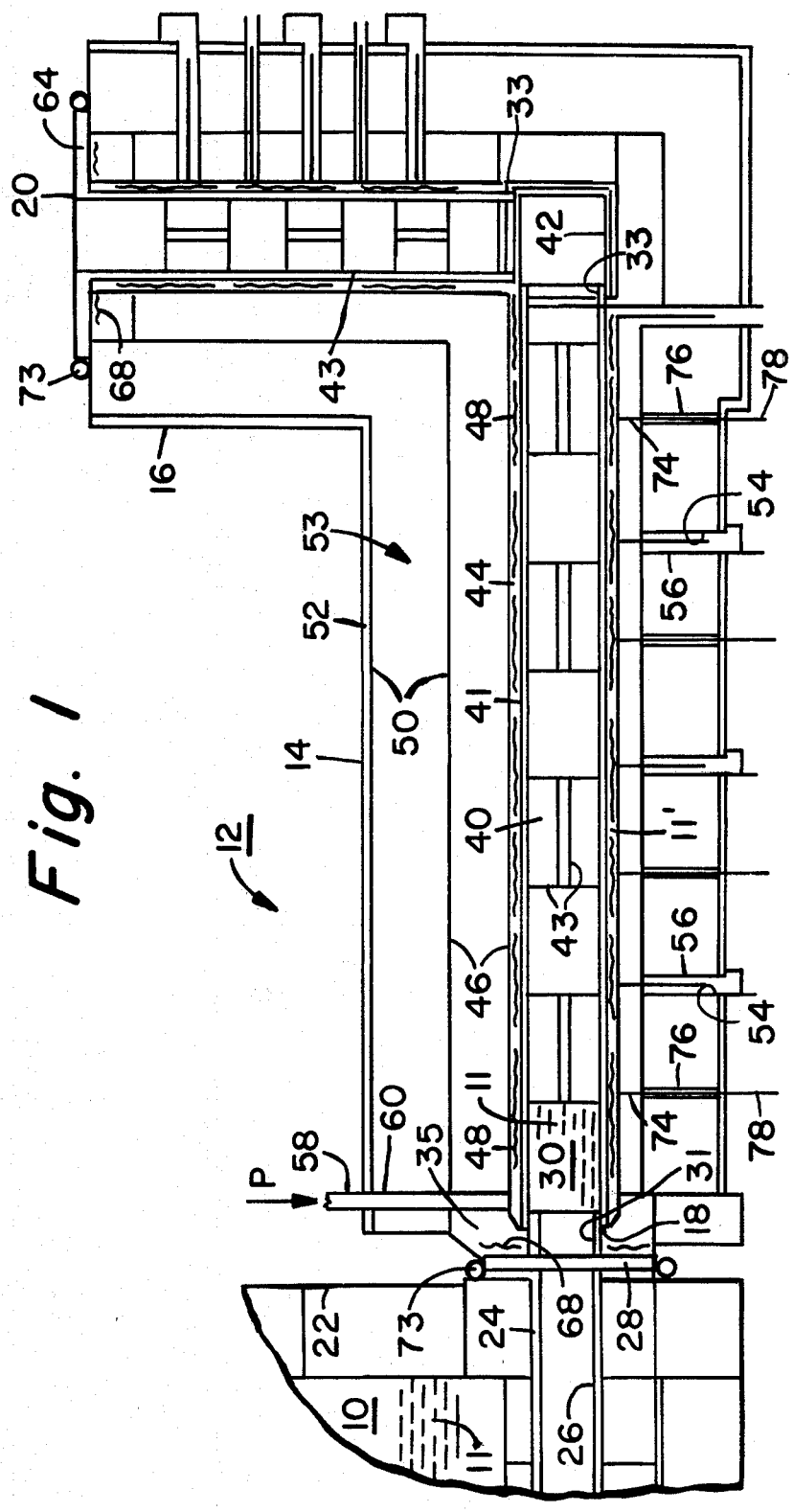
FIG. 1 is a fragmented schematic cross sectional elevation of one embodiment of the delivery system of the present invention.

FIG. 1 shows one embodiment of the present invention for a delivery system 12 for a furnace 10 including a horizontal channel 14 and a vertical riser 16. The delivery system has respective inlet and outlet ends 18 and 20, the inlet 18 being coupled to a furnace 10 and the outlet 20 adapted to be coupled to other downstream connecting channels and the like. A needle or flow control device (not shown) may be located at the outlet 20 to control the flow of thermoplastic material or glass 11 from the furnace 10 through the delivery system 12 into other downstream devices. Furnace 10 includes an upstanding sidewall portion 22 having a through opening 24 therein. An outlet pipe 26 is located within said opening 24 and a flange 28 peripherally attached about said outlet pipe 26 seals the opening 24 exterior of the furnace 10. The arrangement, thus far, is similar to that shown in Spremulli noted above.

The outlet pipe 26 and flange 28 are preferably manufactured of materials which are highly corrosion resistant and although in the present invention a refractory metal such as moly is preferred, other materials such as tungsten, tantalum, rhenium, columbium, steel or alloys thereof may be used. Also noble metal, such as platinum, and rhodium or alloys thereof may be used where appropriate. An outlet 30 of the pipe 26 extends beyond the flange 28 for sleevable connection to the delivery system 12.

In one preferred embodiment of the present invention, the delivery system 12 includes an internal conduit, pipe means or flow path 40 which comprises respective horizontal and vertical cylindrical pipes 41 and 43, and an intermediate connecting elbow 42 sleevably coupled end to end as shown. Mixer elements 43 are located axially of conduit 40 to shear the glass 11 for thermally and physically homogenizing it as it passes through conduit 40. A refractory brick structure 46 surrounds conduit 40 in a spaced relation thereby providing an annular chamber or space 44 about the conduit 40. The refractory brick structure 46 may be manufactured of a glass contact material such as Corhart UNICOR I.

A layer of insulation 50 surrounds the refractory brick structure 46. An outer shell or housing 52 covers the insulation 50 and defines an interior chamber 53. Water cooled electric power connectors 56 are coupled to the heaters 48 and pass through openings or passageways 54 in insulation 50, shell 52 and refractory brick structure 46.

As mentioned previously, pipe members 41 and 43 and the elbow 42 are preferably manufactured from a highly corrosion resistant refractory metal such as molybdenum. Although other materials may be used, it has been found that molybdenum is more easily fabricated than other refractory metals and is highly resistant to the effects of flowing thermoplastic material such as glass. Because moly oxidizes at above 550° C., means is provided for protecting moly from oxidation. The interior of the conduit 40 is protected from oxidation by the presence of the glass 11 from the furnace 12. Exterior of the conduit 40, the chamber 44 may be prefilled with a mixture of glass cullet 11'. When melted, the cullet 11' forms a layer of protective material about conduit 40. The chamber 44 may also receive molten glass 11 from the furnace 10 via sleeve connection 31 between the outlet 30 of the furnace pipe 26 and the inlet 18 of conduit 40, as well as sleeve connections 33 between respective horizontal and vertical pipes 41 and 43 with elbow 42. A flange 64 seals the chamber 44 near the outlet end 20 of the conduit 40. Similarly, a refractory block 35 surrounding sleeve connection 31 at inlet end 18 of conduit 40 prevents seepage of glass 11 from without chamber 44. The glass 11' surrounding the conduit 40 in chamber 44 tends to stagnate and remain trapped therewithin thus preventing possible refractory contamination from entering the conduit 40 and being used to make product. The sleeve connections 31 and 42 accommodate expansion and contraction of the conduit 40 due to thermal cycling of the system.

A plurality of heaters 48 immersed in the cullet 11' may be located within the annular chamber 44 to provide proximate heating thereto and thereby control the temperature of glass 11 within said conduit. The heaters 48 may be commercially available mesh rod, plate and ribbon devices. A variety of suitable materials are available for manufacture of the heater 48 including moly, tungsten and platinum. In addition to providing heat input to the glass 11 within conduit 40, the heaters 48 are used for initially melting the cullet 11' within the chamber 44. The heaters 48 may also serve a dual purpose and be used as electrodes for joule effect heating of the glass 11 by changing the power supplied thereto.

Flange heaters 68 may be located adjacent the flanges 28 and 64 to provide some supplemental heat for start up. During normal operation, subsequent to startup, flange heaters 68 are normally shut down, but could be used for glass temperature control if needed. The heaters 68 may be coupled to a source of electricity via means similar to connectors 56 although not shown.

Cooling pipes 73 may be provided peripherally about each of the flanges 28 and 64. Glass 11 and cullet 11' proximate the flanges 28 and 64 and closely adjacent structures becomes frozen or at least highly viscous and thus creates a glass tight seal to prevent glass leakage from near the inlet end 18 and outlet end 20 of conduit 40 and from within the chamber 44. Also, since it is preferred that flanges 28 and 64 are fabricated from moly, the cooling provided by cooling pipes 73 reduces the temperature of the flanges 28 and 64 below the oxidation temperature of the moly.

A purge line 58 passing through an opening 60 in the housng 52, insulation 50 and refractory structure 46 provides an inlet for purge gas P into the space 44. The purge gas P may also be allowed to infiltrate to the chamber 53. The reason for the introduction of purge gas P is that, before startup, oxygen contaminants will undoubtedly be trapped within the housing 52. If as preferred moly is used to fabricate the conduit 40, flanges 28 and 64 and heaters 48, oxygen must be thoroughly purged. After startup when the glass 11' in the space 44 melts, the purge P is no longer required.

One or more thermocouples 74 may be located at various points along conduit 40 in openings or passageways 76 in housing 52, insulation 50 and refractory 46 to provide output signals over connecting wires 78 indicative of the temperature of the conduit 40 and the glass 11 contained therein. Each of the heaters 48 may be separately controlled to regulate the heat input into the system all along conduit 40 in response to outputs of thermocouples 74. Thus, temperature gradients in the glass 11 may be moderated and localized hot spots may be prevented.

It should be understood that other arrangements for connecting the furnace 10 and delivery system are possible besides the sleeve connection 31 between outlet pipe 28 and conduit 40. However, for purposes of repair and the like, the arrangement herein described is preferred because of the relative ease with which a break or separation may be made between the aforementioned components. The sleeve connection 31 also allows for expansion and contraction of the outlet pipe 26 relative to the conduit 40 in a simplified and practical manner.

Figure 2:
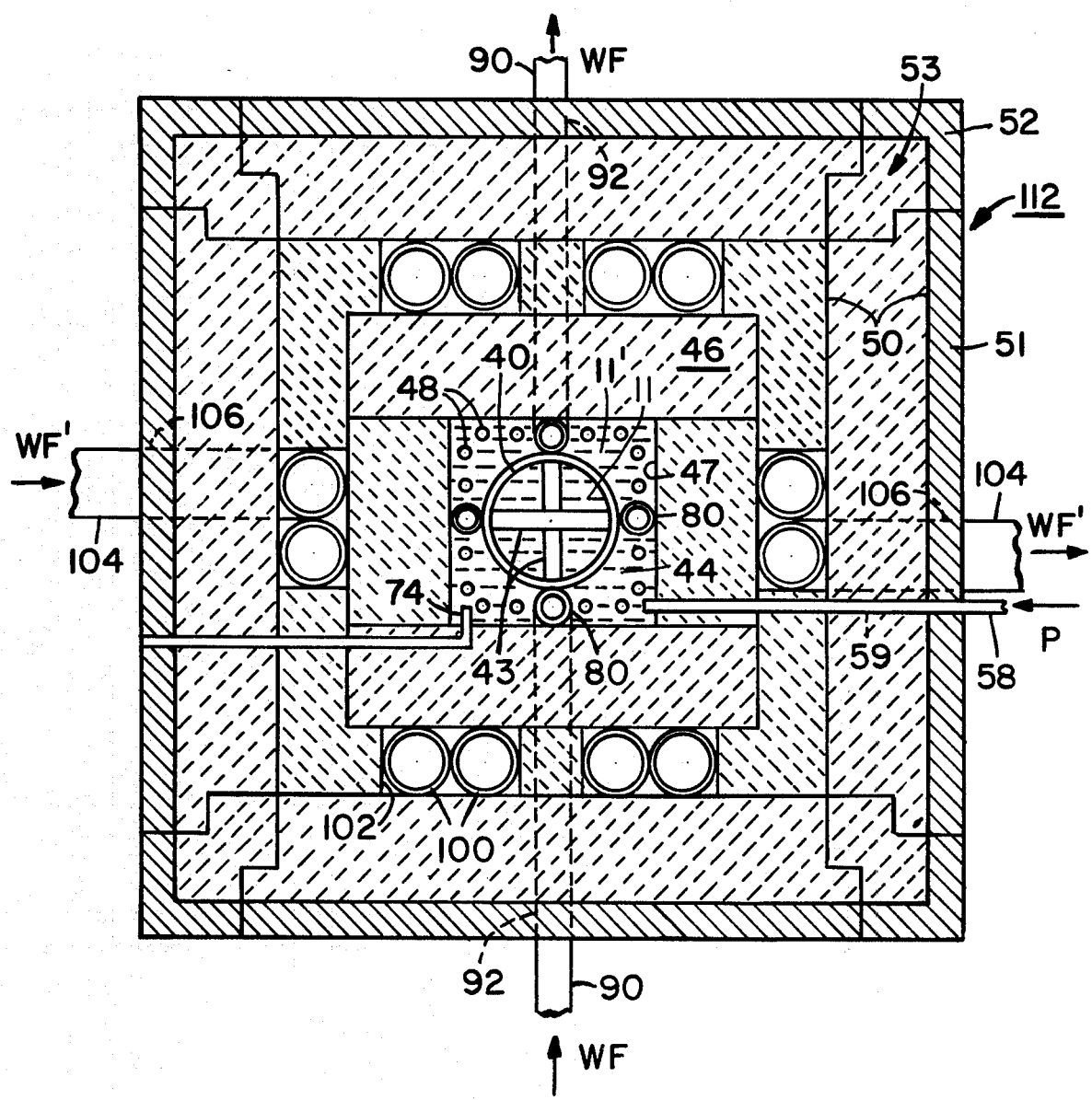
FIG. 2 is a schematic axial cross section of another embodiment of the present invention showing heat exchange means for glass conditioning.

In another embodiment of the present invention, shown in the axial cross section of FIG. 2, similar elements are numbered with the same reference numerals with respect to FIG. 1. A glass delivery system 112 includes an outer shell or housing 52 defining chamber 53, an insulating blanket 50, a refractory brick structure 46 and an internally located conduit or pipe means 40. An annular chamber or space 44 is defined between conduit 40 and internal walls 47 of refractory structure 46. The annular space 44 is filled with glass cullet 11' which becomes molten after the system is in operation. Heaters 48 may be located within the annular chamber 44 for the purposes hereinbefore described. It should be noted that in either embodiment, conduit 40 could be electrified directly by one or more connections to act as a heater in lieu of or as a supplement to the separate heaters 48. Mixer elements 43 similar to those described in reference to FIG. 1 are located axially of conduit 40.

Inner cooling pipes 80 preferably manufactured of moly and carrying a working fluid WF, may be located within the space 44 about the conduit 40 axially aligned therewith and tangentially centering it within refractory structure 46 as shown. Inlet/outlet pipes 90 are suitably manifolded with the inner cooling pipes 80 to conduct the working fluid WF into and out of each of said inner cooling pipes 80 via openings 92 in the housing 52, insulation 50 and refractory 46. The inner cooling pipes 80 being proximate the conduit 40 may be operated so as to provide for sharp changes in the temperature of the glass 11 within the conduit 40 if such control is required.

Outer cooling pipes 100 are located in recesses 102 of the refractory brick structure 46. These outer pipes 100 are manufactured of refractory tubing such as alumina or a high temperature steel alloy and are similarly suitably manifolded for receiving a second source of working fluid WF' via connector pipes 104 in openings 106 of the housing 52, insulation 50 and refractory 46.

As can be fully appreciated from the drawing, the outer cooling pipes 100 are significantly larger in diameter than the inner pipes 80 mentioned above. The reason for this is that the outer pipes 100 are adapted to carry relatively large volumes of working fluid WF in comparison to inner pipes 80. Consequently outer pipes 100 carry a greater proportion of the heat exchange or cooling load for the system as a whole over longer periods of time than the inner pipes 80. Furthermore, because of their proximity to the conduit 40, inner pipes are designed to more rapidly or instantaneously affect the temperature of conduit 40 and glass 11 therein, as well as the glass 11' in annular space 44. The greater volume of working fuid WF' available for the outer pipes 100 enables the system to be operated over a greater range of heating and cooling loads. Operating together, the respective inner and outer cooling pipes 80 and 100 provide means for relatively stable and versatile control of the system. Each working fluid WF and WF' should be inert relative to the respective inner and outer cooling pipes 80 and 100 through which they flow. For simplified operation each working fuid WF and WF' could be the same composition.

The delivery system 112 shown in FIG. 2 is more versatile than the system of FIG. 1 because of the provision for respective inner and outer cooling pipes 80 and 100. However, each system can be more or less complex depending on needed results. The incorporation of the respective inner and outer cooling pipes 80 and 100, heaters 48, mixing devices 43 and the like depends on system application. In either embodiment the insulation 50 surrounding the refractory brick structure 46 may be selectively removed in part to differentially regulate heat dissipation. This may be accomplished by means of removable panel and insulation portions 51 of housing 52 (see FIG. 2). Thus, the present invention may be adapted for multiple uses.

The present invention is rather simple and compact in its design dimensions. For example arrangements shown in FIGS. 1 and 2 may be less than 2'×2' in axial cross section, with a length dimension being dependent upon the parameters of the materials to be melted and the space requirements of the facility. Where space is at premium, the axial cross section can be further reduced by using zircon super insulation and heat shields as shown in copending U.S. patent application Ser. No. 244,001. Such arrangements are significantly smaller than conventional delivery systems.

Purge gas P may be introduced locally to specific locations (i.e. into space 44) over purge line 58 passing through an opening 59 in the housing 52, insulation 50 and refractory 46. The entire volume within the chamber 53 may be purged by means of diffusion of purge gas P throughout. One or more thermocouples 74 may be provided for the purpose discussed above with respect to FIG. 1.

The use of conduit 40 to carry the glass 11 provides a system which is virtually impervious to contamination by corrosion or outgassing of the refractory structure 46. Such an arrangement enhances glass quality since refractory contamination produces cord in the glass. Further, volatilization of the glass composition is inhibited by the use of the conduit 40.

While there has been described what at present are considered to be the preferred embodiments of the present invention, it will be apparent to those skilled in the art that various changes and modifications may be made therein without departing from the invention and it is intended in the appended claims to cover all such changes and modifications as fall within the true spirit and scope of the invention.

I claim:

1. A delivery apparatus for a furnace for conditioning a supply of relatively hot molten thermoplastic material contained within said furnace and supplied at an outlet thereof by controlled dissipation of heat energy therefrom comprising: a pipe having an inlet coupled to the furnace outlet for receiving said thermoplastic material therefrom and delivering the same to a desired location from an outlet thereof and conditioning the material to a desired homogeneity and temperature upon delivery; a refractory structure located in spaced relation about said pipe forming a space between an exterior of the pipe and the refractory structure and defining a chamber which surrounds said pipe and extends between said pipe and said structure, and heater means located in the chamber proximate the pipe for supplying heat thereto, said chamber having an opening in communication with the supply of thermoplastic material in at least one of the pipe and the furnace so as to receive therefrom a portion of the supply of thermoplastic material to thereby immerse the pipe and heater means therein.

2. A furnace delivery apparatus as defined in claim 1 wherein said structure has openings and fluid passageways therethrough for circulation of a heat exchange fluid therein.

3. A furnace delivery apparatus as defined in claim 1 including means for protecting surfaces of the structure and the pipe which form inside surfaces of the chamber from deleterious ambience including passage means for supplying said chamber with a purge fluid relatively inert with respect to the structure and the pipe.

4. A furnace delivery apparatus as defined in claim 1 further comprising:
   a heat exchange structure disposed in spaced relation about said pipe;
   heat insulating means surrounding said structure;
   means for conveying a first gaseous fluid in said heat exchange structure in heat exchange relation therewith and the pipe; and
   the heater means being located proximately about the pipe for providing heat input at selected locations thereabout;
   said heater means, said means for circulating the fluid within said heat exchange structure and said heat insulating means functioning in combination to produce means for governing the temperature of the thermoplastic material to the desired thermal homogeneity as it passes through said pipe.

5. A delivery apparatus as defined in claim 1 including stationary shearing means located within said pipe for homogenizing the consistency of the thermoplastic material passing therethrough.

6. A delivery apparatus as defined in claim 1 wherein said pipe is fabricated from a noble metal.

7. A delivery apparatus as defined in claim 1 wherein said pipe is an oxidizable refractory metal selected from the group consisting of molybdenum, tungsten, tantalum, rhenium, columbium, steel and alloys thereof.

8. A delivery apparatus as defined in claim 4 wherein said means for conveying said first gaseous fluid includes a plurality of first cooling pipes axially supported in recesses in said structure and being spaced apart from said pipe for carrying the first fluid.

9. A delivery apparatus as defined in claim 8 further including means within said closed chamber for conveying a second gaseous fluid in heat exchange relation with said pipe.

10. A delivery apparatus as defined in claim 9 wherein said means for conveying the second fluid includes a plurality of second cooling pipes located axially adjacent the pipe and tangentially centering same within said closed chamber.

11. A delivery apparatus as defined in claim 10 wherein the first cooling pipes are diametrically larger than the second cooling pipes, the first working fluid carries a significantly larger portion of heat exchange load produced by the thermoplastic material than the second working fluid and the second working fluid carrying a greater instantaneous change in heat load than the first working fluid.

12. A delivery apparatus as defined in claim 1 wherein the heater means comprises a plurality of heater elements located proximately with said pipe for providing heat input thereto.

13. A delivery apparatus as defined in claim 1 wherein heater means comprises a portion of said pipe being connected with a source of electrical power.

14. A delivery apparatus as defined in claim 1 including electrode means located in communication with said chamber for providing electrical joule heating energy through said thermoplastic material.

15. A delivery apparatus as defined in claim 1 including expandable means in communiction with at least one end of said pipe being adapted to accommodate relative motion of the pipe and furnace through thermal cycling of the apparatus.

16. A delivery apparatus as defined in claim 15 wherein said expandable means comprises a sleevable connection between said pipe and said furnace.

17. A delivery apparatus as defined in claim 1 including a flange portion supportively coupled about at least one of the inlet and outlet of said pipe, said flange extending radially outward thereof in communication with said structure for sealingly closing the chamber.

18. A delivery apparatus as defined in claim 17 including flange cooling means located in thermal communication with at least a circumferential portion thereof.

19. A delivery apparatus as defined in claim 1 wherein the heat insulating means is selectively arranged about the refractory structure for differentially regulating heat energy along said conduit.

20. A method of conditioning a supply of thermoplastic material existing at virtually any condition between a solid relatively cold condition and a molten relatively hot condition comprising the steps of: confining the material to a selected flow path, conducting the material along the flow path from an inlet end to an outlet end thereof, regulating the rate of heat energy dissipation from the material along said flow path including the step of at least one of heating said material and heat exchanging and removing heat energy given up by said material along said path, forming a concentric annular chamber surrounding the flow path, said chamber having wall portions in spaced relation with said flow path, said wall portions defining a space within said chamber, and communicating the supply of the material into the chamber for surrounding the flow path with thermoplastic material to thereby immerse the same in said material within said chamber.

21. A method as defined in claim 20 including the step of introducing a gaseous substance into said chamber proximate said flow path for protecting same for deleterious ambience.

22. A method as defined in claim 20 including the step of introducing said hot material at the path inlet at a relatively nonuniform temperature distribution across said path and wherein the temperature of the material introduced is relatively hot up to about 2100° C.

23. A method as defined in claim 20 including the step of accommodating thermal expansion of the flow path relative to inlet and outlet ends thereof.

24. A method as defined in claim 20 including the step of shearingly impeding the flow of said material along said flow path.

25. A method as defined in claim 20 wherein the step of heating the material includes at least one of the steps of supplementing heat carried by said material and heating the material to a molten state from a cold solid condition.

26. A method as defined in claim 20 including the step of selectively insulating the flow path for regulating the rate of heat dissipation therealong.

27. A method as defined in claim 20 wherein the step of heat exchanging and removing heat given up by said material along said flow path includes providing at least first and second means for conveying respective working fluids in heat exchange relation with the flow path, the first one of said means carrying a significantly greater portion of heat exchange load produced by the material than the second means, said second means carrying a greater instantaneous change in heat load than the first means.

* * * * *